United States Patent

[11] 3,619,297

[72] Inventor Paul J. Moran
Ballston Lake, N.Y.
[21] Appl. No. 836,778
[22] Filed June 26, 1969
[45] Patented Nov. 9, 1971
[73] Assignee General Electric Company

[54] METHOD OF CHARGING SECONDARY METAL-AIR CELL
1 Claim, 3 Drawing Figs.
[52] U.S. Cl. .................................................... 136/86 A, 136/120
[51] Int. Cl. ........................................................H01m 29/04
[50] Field of Search ........................................ 136/86 A

[56] References Cited
UNITED STATES PATENTS
3,505,113 4/1970 Merten et al. ............... 136/86 A X
3,457,115 7/1969 Kent .............................. 136/86 A Primary Examiner—Allen B. Curtis
Attorneys—Richard R. Brainard, Paul A. Frank, Charles T. Watts, Paul R. Webb, II, Frank L. Neuhauser, Oscar B. Waddell and Joseph B. Forman ABSTRACT: A composite gas diffusion electrode has an electrically conductive porous substrate, a noble metal or non-noble metal catalytic material impregnated into the substrate, and a porous, electrically conductive sheet adjacent to and spaced from one surface of the substrate and electrically insulated therefrom, the porous sheet having a lower oxygen overvoltage than the substrate, and electrical insulation means disposed between the sheet and the substrate. A modified gas diffusion electrode has electrical insulation means of at least one chemically inert, porous separator positioned between the substrate and the porous sheet. During the charging of a cell employing the above types of electrodes, the porous sheet provides isolation of oxygen gassing at the porous sheet while the porous separator provides additional physical spacing of the oxygen gassing at the porous sheet from the catalytically impregnated substrate.

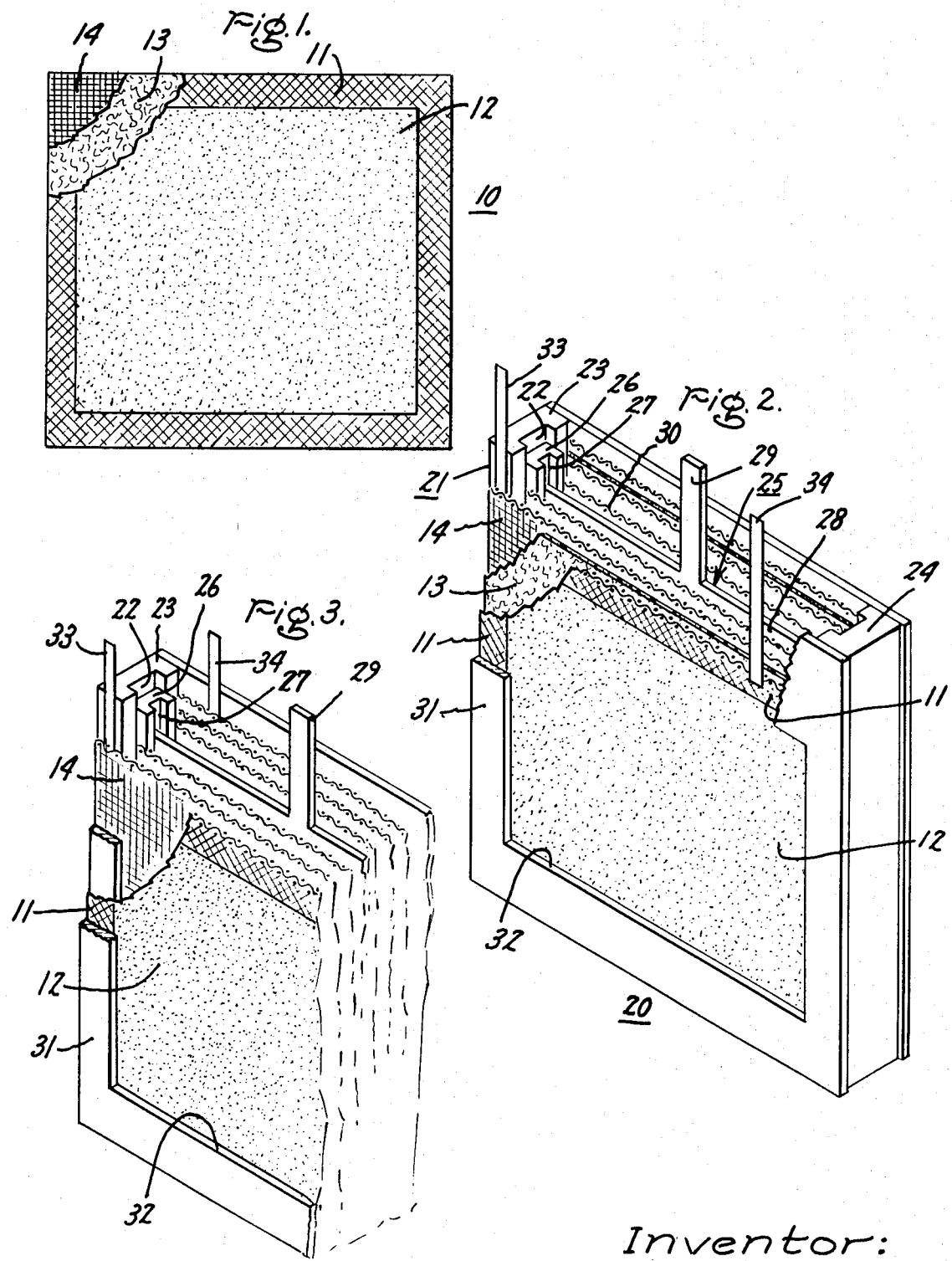

METHOD OF CHARGING SECONDARY METAL-AIR CELL

COMPOSITE GAS DIFFUSION ELECTRODE

This invention relates to composite gas diffusion electrodes and, more particularly, to composite gas diffusion electrodes in which a catalytic material is deposited into an electrically conductive, porous substrate for employment in secondary electrochemical cells.

The invention described herein was made under Contract No. DAAB-07-67-CO257 with the Department of the Army.

A secondary metal-air cell is a galvanic cell which uses an oxidant of oxygen, or oxygen from the air as the reactive material consumed at the positive electrode of the cell. The oxygen thereby serves as the cathode depolarizer. Such a cell employs generally an alkaline electrolyte. A gas diffusion cathode is used generally which has an electrically conductive, porous substrate and catalytic material deposited into the substrate. Cadmium, zinc and lead are commonly used anode materials in such cells since they are generally low in cost.

In such a secondary cell a problem exists during charging in which the porous substrate of the cathode, which includes a metal such as nickel, oxidizes during the evolution of oxygen at this electrode. Such substrate oxidation occurs without regard to the type of catalyst material which is employed for the electrode. This oxidation results in problems during subsequent cell discharge, such as electrolyte wetting of the cathode which reduces cathode life, and of elevated voltage in the initiation of discharge which requires separate control equipment to reduce the voltage to its normal condition.

In my copending patent application filed Sept. 3, 1968, Ser. No. 756,795, there is disclosed and claimed a composite gas diffusion electrode which eliminates the above problem of cathode substrate oxidation during cell charging by incorporating a porous, electrically conductive sheet adjacent one surface of the electrode substrate and in electrical contact therewith, and the sheet having a lower oxygen overvoltage than the substrate with catalytic material. My copending patent application is assigned to the same assignee as the present application.

During the charging of the above type of secondary cell employing a cathode with a non-noble metal catalyst, a second severe problem exists. The oxygen evolution at this electrode destroys or severely damages the non-noble metal catalyst. Noble metal catalysts are not subject to destructive catalyst oxidation damage of this type. Thus, while a low cost non-noble metal catalytically deposited gas diffusion electrode would be highly desirable in a secondary electrochemical cell, non-noble metal catalysts are destructively sensitive to oxidation.

In my copending patent application filed Nov. 1, 1968, Ser. No. 772,585, there is disclosed and claimed a composite gas diffusion electrode which eliminates the above second problem of oxygen evolution at the electrode by incorporating at least one chemically inert, porous separator between the substrate and porous sheet which are in electrical contact.

My present invention is directed to an improved composite gas diffusion electrode with either a noble metal or a non-noble metal catalyst which eliminates both of the above problems of substrate oxidation and catalyst destruction by oxygen evolution during cell charging.

It is a primary object of my invention to provide a composite gas diffusion electrode with either a noble metal or a non-noble metal catalyst for a secondary electrochemical cell in which neither the catalyst nor the substrate is damaged by oxygen evolution during cell charging.

In accordance with my invention, a composite gas diffusion electrode comprises an electrically conductive, porous substrate, catalytic material deposited into the substrate, a porous, electrically conductive sheet positioned adjacent to and spaced from one surface of the substrate and electrically insulated therefrom, the porous sheet having a lower oxygen overvoltage than the substrate, and electrical insulation means between the sheet and the substrate.

These and various other objects, features and advantages of the invention will be better understood from the following description taken in connection with the accompanying drawing in which:

FIG. 1 is an elevation view partially in section of a composite gas diffusion electrode embodying my invention;

FIG. 2 is a perspective view of a metal-air cell employing a pair of electrodes as shown in FIG. 1; and FIG. 3 is a partially perspective view of a metal-air cell employing a pair of modified electrodes embodying my invention.

In FIG. 1 of the drawing, there is shown generally at 10 a composite gas diffusion electrode embodying my invention. Electrode 10 comprises an electrically conductive, porous substrate 11 which is shown as a sintered nickel plaque, with non-noble metal catalytic material 12, which is shown as a nickel cobalt spinel and a binder deposited into substrate 11. The catalytic material is bonded to substrate 11 by a binder of a suitable material, such as polytetrafluoroethylene. Additionally, the exterior face of the catalytic material 12 may be coated with a thin film of polytetrafluoroethylene to provide waterproofing for the electrode. Electrical insulation in the form of a chemically inert, porous separator 13 of a material, such as unwoven Nylon plastic fabric, is positioned adjacent one surface of non-noble metal catalytically impregnated substrate 11. A porous, electrically conductive sheet 14 is positioned adjacent the opposite surface of the porous separator 13 whereby sheet 14 is spaced physically from substrate 11. Sheet 14 is shown in the form of a porous stainless steel screen which has a lower oxygen overvoltage than substrate 11.

I have discovered that an improved gas diffusion electrode can be constructed by employing an electrically conductive, porous substrate with either a noble metal or a non-noble metal catalytic material deposited therein, electrical insulation in the form of at least one chemically inert, porous separator positioned adjacent one surface of the catalytically impregnated substrate, and a porous, electrically conductive sheet of lower oxygen overvoltage than the substrate positioned adjacent the opposite surface of the separator.

The substrate is usually a metal, such as nickel, or has a metallic coating thereon and is usually in the form of a screen, a plaque, or a powder. The catalytic material is a noble metal or a non-noble metal material deposited into the substrate with a binder. Suitable noble metal catalysts include platinum, palladium, etc. Suitable non-noble metal catalysts include activated carbons; spinels, such as cobalt aluminate and nickel cobalt; silver; supported silver, etc. For such an electrode, the porous electrically conductive sheet, which must have a lower oxygen overvoltage than the substrate, can be selected from or coated with metals including iron, cobalt, their respective alloys, steels and stainless steels, since these materials have a lower oxygen overvoltage than the substrate nickel. The porous, electrically conductive sheet can be formed in a variety of configurations including plaques, screens, wires, punched plate, expanded sheet, porous sheet, etc.

At a current density of 100 milliamperes per square centimeter, the overvoltage values in a 36 percent potassium hydroxide solution of nickel, iron and cobalt in volts to a standard hydrogen reference are 0.92, 0.57 and 0.54 volts, respectively. When the porous sheet is made of or coated with such a lower oxygen overvoltage material and spaced from the substrate as described above, the oxygen evolution during cell charging is at the porous sheet in preference to the substrate with impregnated catalytic material. Thus, substrate oxidation is eliminated during cell charging. During subsequent cell discharge, there is no wetting of this electrode and no elevated voltage at the initiation of the discharge.

Electrical insulation in the form of at least one chemically inert, porous separator is shown provided between the catalytically deposited substrate and the porous sheet to space apart the substrate and sheet. During cell charging, the oxygen evolution at the porous sheet is separated from the non-noble metal catalyst material thereby preventing severe damage or destruction of the catalyst material. The separator distributes also more uniformly the cell electrolyte to the catalytically impregnated substrate. While one porous separator is utilized effectively in my improved composite electrode, a plurality of layers can be employed to increase further the physical separation of the catalytically impregnated substrate and the porous sheet. Additionally, one separator layer can be of a membrane barrier type, such as cellophane. Various materials are suitable for employment as separators in my electrode structure which include unwoven Nylon plastic fabric, unwoven Dynel plastic fabric, etc. Various membrane barrier type separator materials include cellophane, chemically grafted porous polymers, radiation grafted porous polymers, etc.

In FIG. 2 of the drawing, there is shown generally at 20 an improved metal-air cell embodying the composite gas diffusion electrode of my invention. Cell 20 has a casing 21 in the form of a U-shaped frame. A vertical groove 22 is provided for each of the opposite frame members 23 and 24. A unit 25, which is positioned in grooves 22 of members 23 and 24 of casing 21, comprises a pair of spaced guides 26, each of which is provided with a vertical groove 27 to receive an edge of a cadmium anode plate 28. A terminal strip 29 is formed integrally with plate 28 and extends upwardly and outwardly from guides 26. A filter mesh 30 is provided preferably on each side of anode 28 by attachment to opposite sides of guides 26.

On opposite outer surfaces of casing 21, a gas diffusion electrode 10 from FIG. 1 of the drawing is shown sealed thereto. A facepiece 31 is sealed to each of the opposite surfaces of casing 21 and overlies the edges of substrate 11. Each of the face pieces 31 is provided with a large opening 32 whereby each electrode 10 lying within open portion 32 forms the gas permeable, liquid impermeable cathode which is coextensive with opening 32. A terminal strip 33 is attached to porous sheet 14 at its edge to provide an electrical connection for the sheet. Porous sheet 14 faces anodes 28 and will contact the aqueous electrolyte. A terminal strip 34 is attached to substrate 11 at its edge to provide an electrical connection for the cathode.

In FIG. 3 of the drawing, there is shown generally at 35 a partial view of a metal-air cell embodying a modified composite gas diffusion electrode of my invention. The same reference numerals have been applied in FIG. 3 as in the previous figures for similar parts. The modified composite diffusion electrode comprises porous sheet 14 spaced physically from and electrically insulated form the catalytically impregnated substrate 11. No separator is positioned between the sheet and substrate as described and shown in FIGS. 1 and 2. The physical separation and electrical insulation between each sheet and associated substrate can be accomplished in various manners. For example, electrically insulated material in various configurations is positioned along the peripheries of the sheet and the associated substrate.

I found also an improved method of charging the above secondary metal-air cell which comprises assembling the metal-air cell as described above in either FIG. 2 or 3, and applying a charging current across the anode and cathode. During charging, oxygen evolution occurs at the porous, electrically conductive sheet and not at the substrate thereby protecting the substrate with catalytic material from oxidation with subsequent elimination of electrolyte wetting of the electrode and of elevated voltage upon initial discharge. Secondly, the oxygen evolution at the constructive sheet was spaced additionally in FIG. 2 by a porous separator from the non-noble metal catalyst of the cathode thereby protecting the catalyst from additional damage or destruction. Additionally, I found further an improved method of generating electrical energy from a secondary metal-air cell comprises assembling the metal-air cell as described above in either FIG. 2 or 3, and applying an electrical load across the anode and cathode.

An example of a gas diffusion electrode which is not made in accordance with my invention is set forth below in example 1. An example of a composite gas diffusion electrode which is made in accordance with my invention is set forth below in example 2. In example 3, the performance is compared of two electrochemical cells employing the electrodes from examples 1 and 2, respectively.

EXAMPLE 1

A gas diffusion electrode was prepared with a nickel cobalt spinel deposited in a sintered nickel plaque impregnated with polytetrafluoroethylene The resulting structure was a gas diffusion electrode containing a non-noble metal catalyst. This electrode was employed subsequently as a cathode in an electrochemical cell which had a conventional cadmium battery plaque anode, and an aqueous solution of 31 weight percent potassium hydroxide in contact with the electrodes. Air was supplied to the gas diffusion electrode. The cell had a useful polarization life of less than 1.0 ampere hours per square cm.

EXAMPLE 2

A composite gas diffusion electrode was prepared by initially using a non-noble metal catalytically deposited substrate as set forth above in example 1. A separator structure was assembled from a layer of unwoven Nylon plastic fabric, a layer of cross-linked high molecular polyethylene, methacrylic acid grafted material for a membrane barrier, and a second layer of unwoven Nylon plastic fabric. This separator structure was positioned adjacent one surface of the substrate. A porous sheet of expanded stainless steel 316 was positioned against the opposite surface of the separator structure thereby spacing the non-noble metal catalytically deposited substrate from the porous sheet. In an electrochemical cell as set forth above in example 1, the composite electrode of example 2 will provide a useful polarization life in excess of 10.3 ampere hours per square cm.

While other modifications of the invention and variations thereof which may be employed within the scope of the invention have not been described, the invention is intended to include such as may be embraced within the following claims:

What I claim as new and desire to secure by Letters Patent of the United States is:

1. A method of charging a secondary metal-air cell comprising providing at least one anode, providing an alkaline electrolyte in contact with the anode, providing a composite laminar gas diffusion cathode comprising an electrically conductive porous substrate with catalytic material in contact with the substrate, a porous, electrically conductive sheet positioned adjacent to and spaced from one surface of the substrate and electrically insulated therefrom, the porous sheet having a lower oxygen overvoltage than the substrate with catalytic material, and electrical insulation means disposed between the sheet and the substrate with catalytic material, positioning the composite cathode in contact with the electrolyte and spaced from the anode with the conductive sheet facing the anode, and applying a charging current across the anode and cathode whereby oxygen evolution during charging occurs substantially only at the porous sheet.

* * * * *